(12) United States Patent
Grant

(10) Patent No.: US 11,652,621 B2
(45) Date of Patent: May 16, 2023

(54) USE OF IRRATIONAL NUMBER SEQUENCES TO SECURE STATE TRANSITION FUNCTION IN BLOCKCHAIN TRANSACTIONS

(71) Applicant: Crown Sterling Limited, LLC, Newport Beach, CA (US)

(72) Inventor: Robert Edward Grant, Laguna Beach, CA (US)

(73) Assignee: Theon Technology LLC, Newport Beach, CA (US)

( * ) Notice: Subject to any disclaimer, the term of this patent is extended or adjusted under 35 U.S.C. 154(b) by 0 days.

(21) Appl. No.: 17/705,553

(22) Filed: Mar. 28, 2022

(65) Prior Publication Data

US 2022/0224524 A1 Jul. 14, 2022

Related U.S. Application Data

(63) Continuation-in-part of application No. 17/018,582, filed on Sep. 11, 2020, now Pat. No. 11,310,042.

(51) Int. Cl.
*H04L 29/06* (2006.01)
*H04L 9/08* (2006.01)
*H04L 9/30* (2006.01)

(52) U.S. Cl.
CPC ............ *H04L 9/0861* (2013.01); *H04L 9/302* (2013.01)

(58) Field of Classification Search
None
See application file for complete search history.

(56) References Cited

U.S. PATENT DOCUMENTS

| 5,033,352 A | 7/1991 | Kellogg |
| 5,764,772 A | 6/1998 | Kaufman |

(Continued)

FOREIGN PATENT DOCUMENTS

| EP | 1220174 | 7/2002 |
| EP | 2680488 | 8/2019 |

(Continued)

OTHER PUBLICATIONS

Wang, Jian et al. A Decentralized Electricity Transaction Mode of Microgrid Based on Blockchain and Continuous Double Auction. 2018 IEEE Powers. Energy Society General Meeting (PESGM). https://ieeexplore.ieee.org/stamp/stamp.jsp?tp=&arnumber=8586322 (Year: 2018).*

(Continued)

*Primary Examiner* — Jeremiah L Avery
(74) *Attorney, Agent, or Firm* — Fish IP Law, LLP

(57) ABSTRACT

A method for securely encrypting and decrypting data in a blockchain, wherein a node member of a network involved in executing a state transition function for the blockchain, uses a key derived from a sequence of digits in an irrational number. The irrational number can derive from a ratio and/or a root, and preferably a square root of a non-perfect square. A key might or might not utilize the entirety of the sequence of digits. For example, the key might utilize every other or every third digit in the sequence. A key might alternatively include some or all of the sequence, with one or more additional characters or digits added to the beginning or end of the sequence, or included elsewhere within the sequence. A key might even utilize non-consecutive members of the sequence of digits, or perhaps a reverse or partially reversed sequence.

9 Claims, 6 Drawing Sheets

(56) References Cited

U.S. PATENT DOCUMENTS

| | | | |
|---|---|---|---|
| 5,966,445 | A | 10/1999 | Park |
| 6,072,876 | A | 6/2000 | Obata |
| 6,154,541 | A | 11/2000 | Zhang |
| 6,396,928 | B1 | 5/2002 | Zheng |
| 6,480,605 | B1 | 11/2002 | Uchiyama |
| 6,636,968 | B1 | 10/2003 | Rosner |
| 6,751,736 | B1 | 6/2004 | Bowman |
| 6,763,364 | B1 | 7/2004 | Wilber |
| 6,990,200 | B1 | 1/2006 | Kasahara |
| 7,502,754 | B2 | 3/2009 | Campbell |
| 8,468,244 | B2 | 6/2013 | Redlich |
| 8,516,244 | B2 | 8/2013 | Waters |
| 8,885,820 | B1 | 11/2014 | Lambert |
| 9,450,749 | B2 | 9/2016 | Hammersmith |
| 10,230,703 | B1 | 3/2019 | Lepore |
| 10,476,665 | B1 * | 11/2019 | Griffin .......... H04L 9/0643 |
| 10,911,451 | B2 | 2/2021 | Costa |
| 11,188,977 | B2 * | 11/2021 | Youb .......... G06Q 30/0645 |
| 11,443,310 | B2 | 9/2022 | Bolla |
| 2003/0081785 | A1 | 5/2003 | Boneh |
| 2003/0115449 | A1 | 6/2003 | Yochim |
| 2004/0096056 | A1 | 5/2004 | Boren |
| 2006/0072745 | A1 | 4/2006 | Fukaya |
| 2007/0211893 | A1 | 9/2007 | Frosik |
| 2008/0107274 | A1 | 5/2008 | Worthy |
| 2008/0208560 | A1 | 8/2008 | Johnson |
| 2010/0119061 | A1 | 5/2010 | Kawale |
| 2012/0134495 | A1 | 5/2012 | Liu |
| 2013/0142323 | A1 | 6/2013 | Chiarella |
| 2013/0297937 | A1 | 11/2013 | Fransen |
| 2014/0112469 | A1 | 4/2014 | Layne |
| 2016/0012252 | A1 | 1/2016 | Deleeuw |
| 2017/0222804 | A1 | 8/2017 | Dewitt |
| 2017/0302446 | A1 | 10/2017 | Thorwirth |
| 2017/0310650 | A1 | 10/2017 | McMullen |
| 2018/0101322 | A1 | 4/2018 | Cheriton |
| 2018/0131526 | A1 | 5/2018 | Ellingson |
| 2019/0036678 | A1 | 1/2019 | Ahmed |
| 2019/0089532 | A1 | 3/2019 | Lambert |
| 2019/0120929 | A1 * | 4/2019 | Meadow .......... G01S 5/0036 |
| 2019/0238323 | A1 | 8/2019 | Bunch |
| 2020/0084037 | A1 | 3/2020 | Zhang |
| 2020/0241841 | A1 | 7/2020 | Tamiya |
| 2020/0293212 | A1 | 9/2020 | Narayanamurthy |
| 2020/0366652 | A1 | 11/2020 | Koyun |
| 2020/0396059 | A1 * | 12/2020 | Micali .......... H04L 63/123 |
| 2023/0007439 | A1 * | 1/2023 | Williams .......... H04W 4/021 |
| 2023/0088104 | A1 | 3/2023 | Grant |

FOREIGN PATENT DOCUMENTS

| | | |
|---|---|---|
| JP | 2007157288 | 6/2007 |
| WO | 0065768 | 4/2000 |
| WO | 0065768 | 11/2000 |
| WO | 2005085992 | 9/2005 |
| WO | 2016203762 | 12/2016 |
| WO | 2019110955 | 6/2019 |

OTHER PUBLICATIONS

Wu, Yan et al. Forensic Analysis of Bitcoin Transactions. 2019 IEEE International Conference on Intelligence and Security Informatics (ISI). https://ieeexplore.ieee.org/stamp/stamp.jsp?tp=&arnumber=8823498 (Year: 2019).*

Madhavan, C.E. Veni et al. VSK Chains: Integrated Content and Currency Transaction Blockchains. 2017 23rd Annual International Conference in Advanced Computing and Communications (ADCOM). https://ieeexplore.ieee.org/stamp/stamp.jsp?tp=&arnumber=8691914 (Year: 2017).*

Srikanth, Ch. PhD Forum 2017 New Cryptographic Systems Based on Certain Sequences of Arithmetic Progressions. 2017 23rd Annual International Conference in Advanced Computing and Communications (ADCOM). https://ieeexplore.ieee.org/stamp/stamp.jsp?tp=&arnumber=8691913 (Year: 2017).*

Kumar, et al. "A symmetrical medical image encryption scheme based on irrational numbers," Biomedical Research 2018, Special Issue: S494-S498. 5 pages.

Bhaumik, et al. "Safely Doubling your Block Ciphers for a Post-Quantum World," Inria, Paris. 2020. 49 pages, https://eprint.iacr.org/2022/1342.

"Elliptic Curve Cryptography (Ecc)." 1 page, 2018. https://cryptobook.nakov.com/asymetric-key-ciphers/elliptic-curve-cryptography-ecc.

"Elliptic Curve Over Finite Non-Prime Fields," Mathematics. 2 pages, 2020. https://math.stackexchange.com/questions/3811775/elliptic-curve-over-finite-non-prime-fields.

"Golden Ratio Calculator," Good Calculators. 2 pages, 2022. https://goodcalculators.com/golden-ratio-calculator/.

Grant, et al. "Accurate and Infinite Prime Prediction from Novel Quasi-Prime Analytical Methodology." 8 pages, 2019. https://arxiv.org/ftp/arxiv/papers/1903/1903.08570.pdf.

Grant, Robert E. "Prime Number Pattern Discovery," Discoveries, Publications, Unified Math/Physics. Jul. 2018. 6 pages, https://robertedwardgrant.com/prime-number-pattern-discovery-published/.

Kumar, et al. "A Symmetric Mecial Image Encryption Scheme Based on Irrational Numbers," Biomed Res 2018 Special Issue. S494-S498. 5 pages, https://www.biomedres.info/abstract/a-symmetric-medical-image-encryption-scheme-based-on-irrational-numbers-8148.html.

Grant, et al. "Reciprocal Wave Factorization," Strathspey Crown Holdings. Jun. 2020. 19 pages, https://robertedwardgrant.com/publications/.

Barker, et al. "Recommendation for Pair-Wise Key Establishment Schemes Using Discrete Logarithm Cryptography," NIST. Apr. 2018. 2 pages, https://nvlpubs.nist.gov/nistpubs/SpecialPublications/nist.sp.800-56Ar3.pdf.

Weisstein, Eric W. "Taniyama-Shimura Conjecture," Mathworld—A Wolfram Web Resource. 3 pages, 2022. https://mathworld.wolfram.com/Taniyama-ShimuraConjecture.html.

Wang, et al. "A Decentralized Electricity Transaction Mode of Microgrid Based on Blockchain and Continuous Double Action," IEEE. 2018. 5 pages, https://ieeexplore.ieee.org/stamp/stamp.jsp?tp=&arnumber=8586322.

"Why Are Elliptic Curves Constructed Using Prime Fields and Not Composite Fields?" https://crypto.stackexchange.com. 3 pages, 2017. https://crypto.stackexchange.com/questions/43230/whyare-elliptic-curves-constructed-using-prime-fields-and-not-composite-fields.

"Why is a Prime Number Used in ECDSA?" https://crypto.stackexchange.com/. 3 pages, 2020. https://crypto.stackexchange.com/questions/77884/why-is-a-prime-number-used-in-ecdsa.

Wu, et al. "Forensic Analysis of Bitcoin Transactions," IEEE. 2019. 3 pages, https://ieeexplore.ieee.org/stamp/stamp.jsp?tp—&arnumber=8823498.

Burd, Barry. "A New Approach to Condensing Data Leads to a 99% Compression Rate," TechTarget. May 2015. 9 pages, https://www.theserverside.com/feature/Has-a-New-York-startup-achieved-a-99-compression-rate.

Zhang, et al. "A Blockchain-Based Authentication Method with One-Time Password," IEEE, 2019. 9 pages, https://ieeexplore.ieee.org/stamp/stamp.jsp?tp=&arnumber=8958754.

* cited by examiner

USE OF IRRATIONAL NUMBER SEQUENCES TO SECURE STATE TRANSITION FUNCTION IN BLOCKCHAIN TRANSACTIONS

This application is a continuation-in-part of U.S. patent application Ser. No. 17/018,582, filed on Sep. 11, 2020. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is data and information security.

BACKGROUND

The background description includes information that may be useful in understanding the present invention. It is not an admission that any of the information provided herein is prior art or relevant to the presently claimed invention, or that any publication specifically or implicitly referenced is prior art.

Encryption relying on prime numbers or quasi-prime numbers, such as public-private key cryptography schemes (e.g., the RSA encryption scheme), have been popular because until now deriving prime numbers has been extremely computationally-intensive and as such essentially impossible for practical purposes.

However, as computational resources evolve and new areas emerge (such as quantum computing), the security of these schemes will become weaker and weaker as prime numbers become easier to solve.

One-time pads for passwords are known to be completely secure. However, the use of one-time pads requires that the keys be shared between the parties ahead of time and only be used once. This means that for many exchanges, the parties must have a priori storage of many keys. The difficulties associated with these requirements has resulted in favoring the public key cryptography schemes over one-time pad schemes.

Others have attempted to solve this problem.

WO 20190110955 to Bryant discusses the use of a one-time pad for password generation. However, the solution in Bryant requires the storage of all of the passwords in a large pad, which is resource-intensive.

WO 00/65768 to Persson discusses determining a maximum key length. However, the generation of the shortened key in Persson is performed in such a way that a function can still only be used once.

A "transition" is a discontinuous change, that is, a change that requires a jump. So a "state transition" is a jump from one state to another. For bitcoin, a "state transition" occurs each time a block is accepted, causing the ownership of bitcoins to change. For XRP, a "state transition" occurs each time a new ledger is accepted, causing ownership of XRP, account settings, offers on the decentralized exchange, and other kinds of state to change.

One of the most important properties of almost all blockchains is that from minute to minute, every participant in that system can monitor each state transition as it happens and will refuse to accept that transition if it does not follow the system's rules. So, if you have one bitcoin now, the only way to convince bitcoin participants that you don't have that bitcoin anymore is to show them a transfer that you authorized.

It is specifically contemplated herein that it would be useful to employ a cryptographic system for blockchains that utilize keys of substantially any length, without the attendant problems of storing and transmitting large keys.

Thus, there is still a need to secure blockchain state transitions, using a secure key generation system for encryption and decryption that offers the security of one-time pads while overcoming the traditional limitations of the scheme.

SUMMARY OF THE INVENTION

The inventive subject matter provides apparatus, systems and methods in which a sending device selects a function that is solved to obtain a raw key. The raw key resulting from the function is one of an irrational number or a transcendental number.

Having derived the raw key, the sending computing device then selects a starting point and a length within the raw key. The starting point designates a start digit within the decimals of the raw key, and the length is the amount of digits that will make up the shortened key. The digits following the start digit up to the length can be the consecutive digits following the start digit in the raw key or can, in embodiments, be obtained according to an out-of-order logic (such as a bouncing logic).

The sending computing device then derives the shortened key based on the starting point and length, and uses it to encrypt the message. The starting point and length are saved, as an indicator of the selected function.

The encrypted message is transmitted to a receiving computing device, as is the starting point and length and an indicator of the selected function.

The receiving computing device is able to decrypt the encrypted message by retrieving the function based on the received indicator and then mirroring the steps performed by the sending computing device to derive the corresponding shortened key needed for decryption.

For subsequent messages, the parties only need to exchange new starting points and (optionally, in embodiments) new lengths as they already know the shared function they are using. The function to be used can be changed according to a predetermined schedule or rules (e.g., number of uses), in which case a new designator/indicator will have to be sent by the initiating (i.e., sending) party.

In the context of blockchains a node member of a network involved in executing a state transition function can operate by:
  receiving (a) a proposed transaction, (b) a function resolvable to an irrational number, (c) a starting point and (d) a length;
  using the starting point and the length to determine a sequence of digits within the irrational number;
  using at least a portion of the sequence of digits to determine a key; and
  using they key to encrypt at least a portion of the blockchain during execution of the state transition function.

In some contemplated embodiments, the function from which an irrational number can be determine comprises at least one of a ratio and a root. Preferred roots for this purpose are square roots of non-perfect squares.

A key might or might not utilize the entirety of the sequence of digits. For example, the key might utilize every other or every third digit in the sequence. A key might alternatively include some or all of the sequence, with one or more additional characters or digits added to the beginning or end of the sequence, or included elsewhere within the sequence. A key might even utilize non-consecutive members of the sequence of digits, or perhaps a reverse or partially reversed sequence.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms, is deemed to represent one or more computing devices having at least one processor (e.g., ASIC, FPGA, DSP, x86, ARM, ColdFire, GPU, multi-core processors, etc.) programmed to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

One-time pad ("OTP") is an encryption technique that cannot be cracked. As the name implies, in a one-time pad, a generated key is used only once and then discarded. For one-time pad to be effective, the key generated must be truly random. Also, for one-time pads, the key used to encrypt a message must be at least as long as the message.

Figure 1:
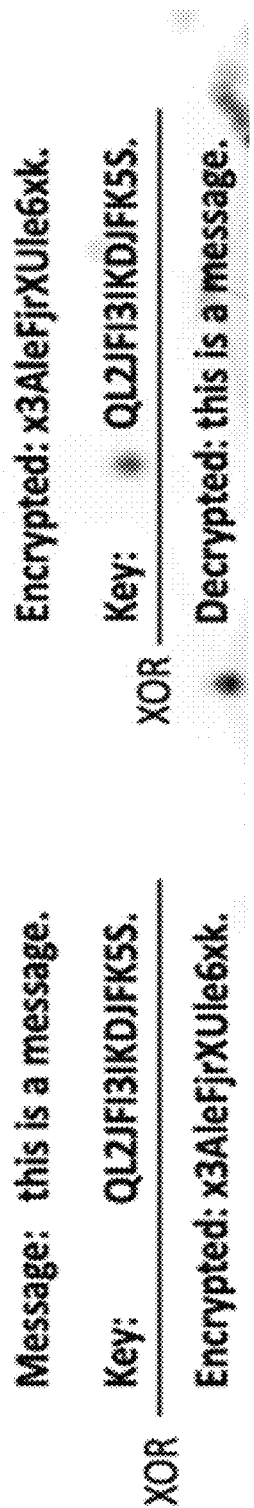
FIG. 1 is an illustration of one-time pad techniques for encryption/decryption, as known in the prior art.

FIG. 1 provides an example of how the one-time pad works. As seen in FIG. 1, an encrypting computing device applies a one-time pad cypher scheme by taking a message/data and applying an encryption key via an XOR function. This results in an encrypted message that, without the proper decryption key, appears to be a random assortment of letters and numbers.

To decrypt the encrypted message, a decrypting computing device (which may or may not be the same computing device that encrypted the message/data) simply reverses the process, applying the key to the encrypted message via the XOR function.

As will become evident in the following discussion, the systems and methods of the inventive subject matter allow for the use of a particular function more than once, which is not possible in traditional one-time pad encryption schemes. Thus, one of the many advantages of the systems and methods of the inventive subject matter is reducing the storage required to apply secure encryption schemes by eliminating the need to store many one-time use keys.

Figure 2:
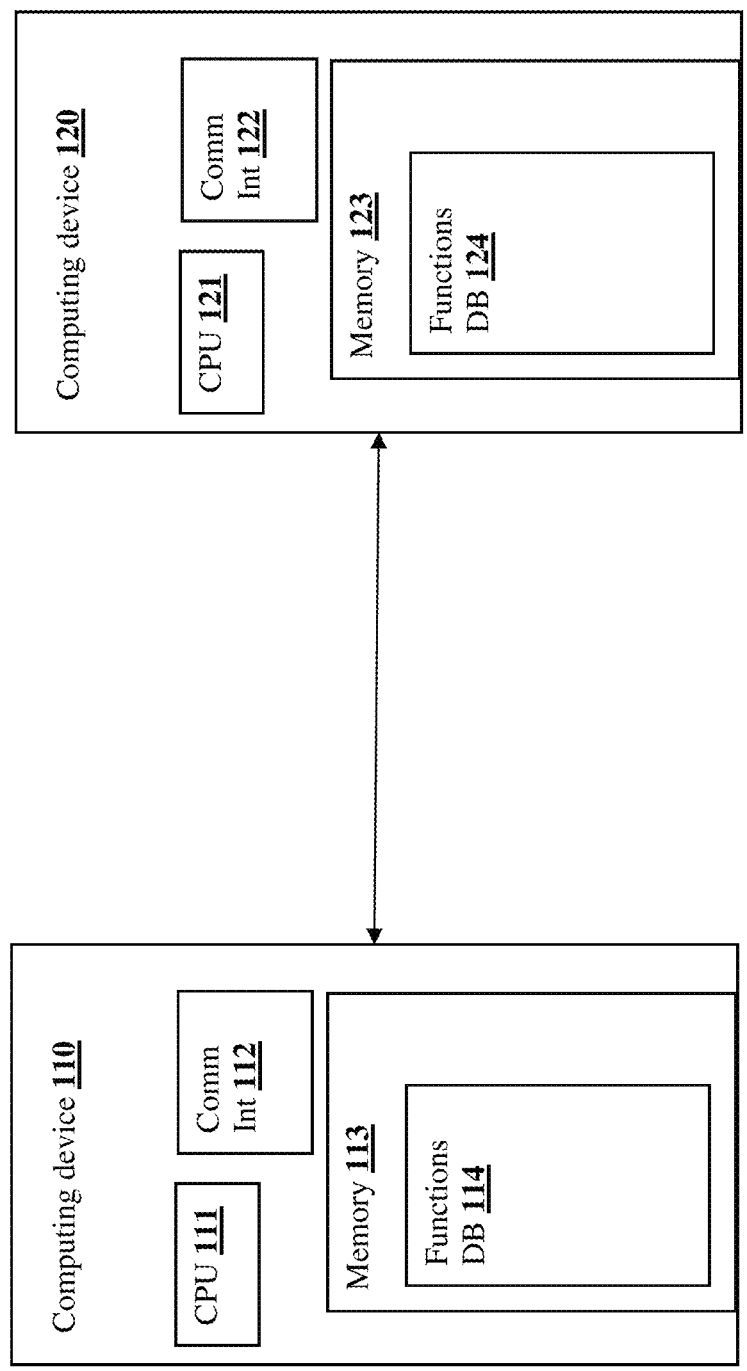
FIG. 2 is a diagrammatic overview of the computing devices used according to embodiments of the inventive subject matter.

FIG. 2 provides a diagrammatic overview of the components of the inventive subject matter. The illustrative example of FIG. 2 shows a sending computing device 110 and a receiving computing device 120.

The sending computing device 110 includes a processor 111, a communication interface 112, and a non-transitory computer-readable memory 113 (e.g., RAM, ROM, hard drive, solid state drive, etc.). The communications interface 112 enables data exchange with other computing devices such as computing device 120 via standard data exchange networks and protocols (e.g., cellular, Wi-Fi, wired, etc.) The memory 113 stores the executable instructions that are executed by the processor 111. As seen in FIG. 1, the memory 113 also includes a functions database 114 that stores one or more functions used according to the embodiments of the inventive subject matter discussed here.

As seen in FIG. 2, computing device 120 (which is referred to as "receiving computing device 120" herein for clarity) has mirroring components.

It should be noted that for the ease of illustration of the inventive subject matter, computing device 110 is the sending device and computing device 120 is the receiving device. However, it is contemplated that computing device 120 can also be programmed to execute the processes discussed herein to encrypt and send a message. Likewise, it is contemplated that computing device 110 can also be programmed to carry out the receiving and decryption functions discussed herein.

Suitable computing devices 110, 120 can include, but are not limited to, desktop computers, laptop computers, smartphones, tablets, servers, game consoles, smart watches, or other devices having processing capacity, data exchange capacity and storage capacity to carry out the processes discussed herein.

Figure 3:
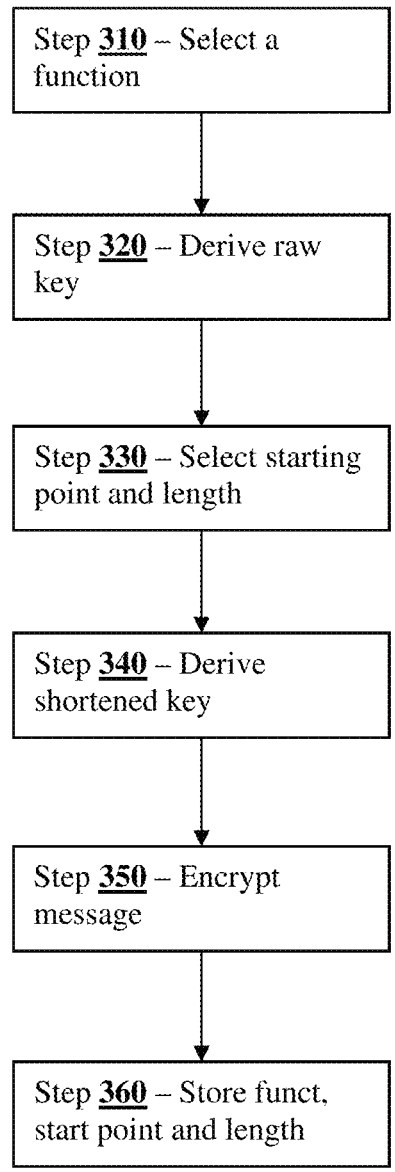
FIG. 3 is a flowchart of the process of encrypting a message, according to embodiments of the inventive subject matter.

FIG. 3 illustrates the processes associated with encrypting a message according to embodiments of the inventive subject matter. Steps 310-360 cover the process of encrypting a message or data.

At step 310, the sending computing device 110 selects a function to be used to obtain a raw key. The function can be a mathematical function or algorithm as discussed further herein. The function can be selected according to a predetermined order or schedule. Alternatively, it can be randomly selected or user-selected. The sending computing device 110 obtains the selected function from the stored functions in functions database 114.

At step 320, the sending computing device 110 solves the function to obtain a raw key. The raw key is either an irrational number or a transcendental number, having an infinite or near-infinite amount of decimal places. Thus, the function is a function whose output is an irrational number and/or a transcendental number. By using an irrational or transcendental number, the systems and methods of the inventive subject matter have the flexibility to obtain many encryption keys from the same function without repeating some or all of the encryption keys. Because irrational numbers do not have a pattern, the systems and methods of the inventive subject matter can ensure true randomness in the generation of cryptography keys. For example, the function can be to take the square root of a non-perfect square number. This results in an irrational number. In an illustrative example, the function to be solved can be the square root of 20.

At step 330, the sending computing device 110 selects a starting point and a length. The starting point designates a start digit in the decimals of the raw key. The length designates the number of digits following the start digit. The start digit and length are preferably integer values such that they identify a precise digit location and precise length.

At step 340, the sending computing device 110 applies the starting point and length to the decimals of the raw key to result in a shortened key. Thus, the shortened key is a key that starts at the start digit and contains the digits following the start digit according to the length.

Figure 4:
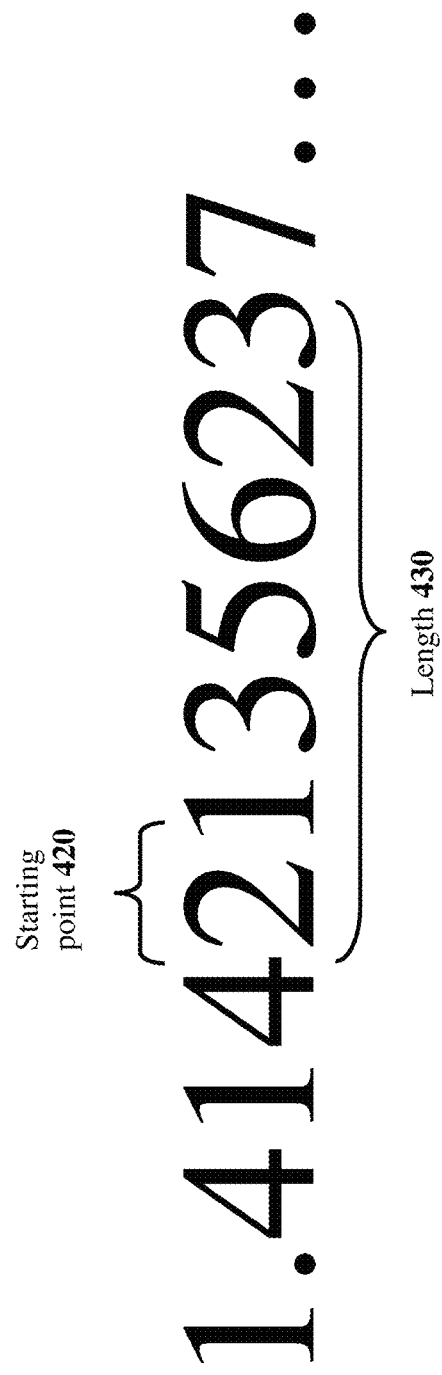
FIG. 4 is an illustrative example of the application of a starting point and length to a raw key, according to embodiments of the inventive subject matter.

FIG. 4 provides a simplified illustrative example of the starting point and length applied to a raw key to generate the shortened key. The example of FIG. 4 includes a raw key 410 (in this simplified example, the square root of 2). The starting point 420 of "4" means the start digit is the fourth digit in the decimals of the raw key. In this, example, the starting point 420 of "4" means that the start digit is "2". The length 430, in this case of 7 characters, designates the length of the shortened key. Thus, in this case, the shortened key is "2135623". It should be noted that the starting point and length of FIG. 4 are for illustrative purposes only. The starting point can be any point along the decimals of the raw key and the length of any suitable length. As mentioned herein, the length can correspond to the message length in certain embodiments.

At step 350, the sending computing device 110 encrypts a message with the shortened key.

At step 360, the sending computing device 110 then stores the selected function (or a designator of the selected function), the starting point and length in a memory.

In embodiments, the function is a ratio with a numerator and denominator that are both integer values. In these embodiments, storing the selected function involves storing the corresponding numerator and denominator values.

Figure 5:
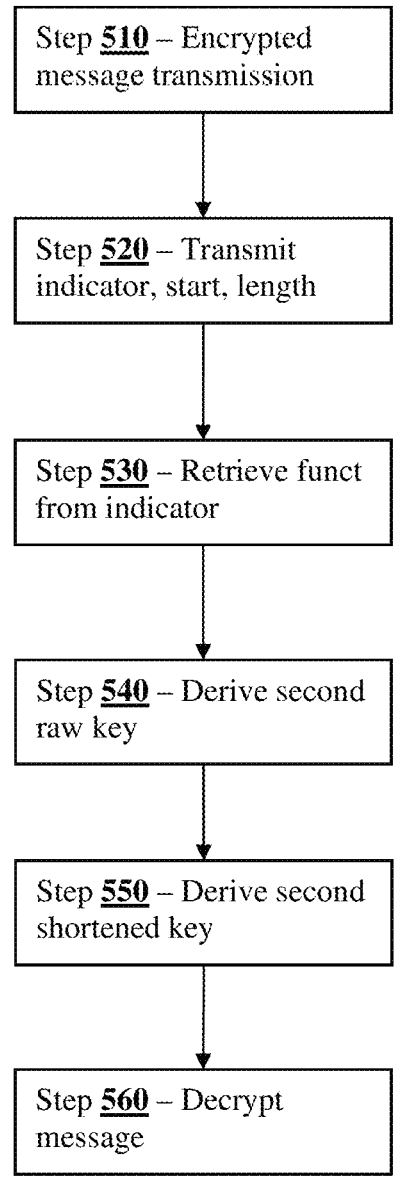
FIG. 5 is a flowchart of the process of receiving an decrypting a message by the receiving computing device, according to embodiments of the inventive subject matter.

FIG. 5 is a flowchart of the reception and decryption of the message, according to embodiments of the inventive subject matter.

At step 510, the receiving computing device 120 receives the encrypted message from the sending computing device 110.

At step 520, the sending computing device 110 transmits an indicator of the function, the starting point and the length to the receiving computing device 120. The indicator can be an address location, a location on a list of functions, an identifier, a pointer, or other information that directs the receiving computing device to find the corresponding function within its own functions database. Preferably, the encrypted message is sent separately from the indicator, the starting point, and the length. However, in other embodiments, one or more of the indicator, starting point and length can be sent together with the encrypted message.

At step 530, the receiving computing device 120 obtains the function based on the received indicator.

At step 540, the receiving computing device 120 solves the function to get a corresponding second raw key. This step mirrors step 320 executed by the sending computing device 110. As such, the second raw key is considered to be identical to the raw key generated by the sending computing device 110 at step 320.

At step 550, the receiving computing device 120 applies the received starting point and length to the derived second raw key to produce a second shortened key. The second shortened key is identical to the shortened key that the sending computing device 110 generated at step 340.

The receiving computing device 120 then uses the generated shortened key to decrypt the encrypted message at step 560.

Figure 6:
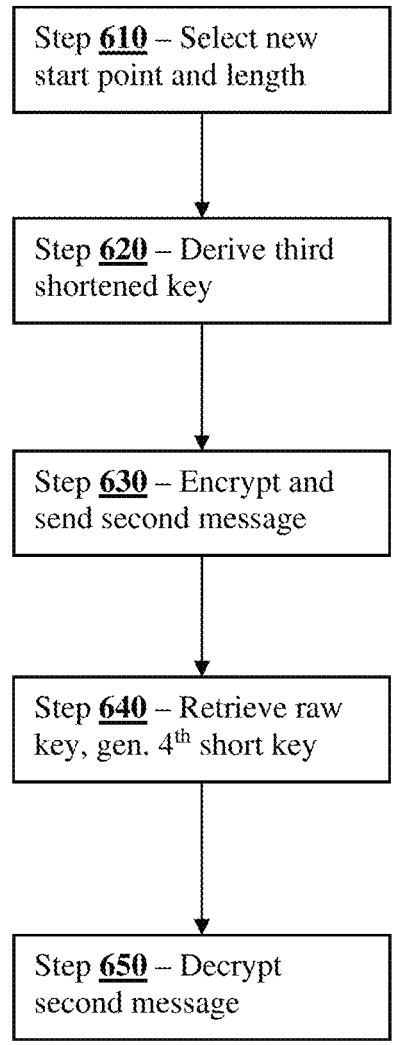
FIG. 6 is a flowchart of a subsequent message encrypted, sent and decrypted, according to embodiments of the inventive subject matter.

For subsequent messages between the computing device 110 and computing device 120 (in either direction), the sending party can simply transmit the starting point and length information along with the encrypted message to the receiving party. Since both parties already know the function to be solved (identified at step 310), subsequent sending of this information is unnecessary until the function to be used as the seed is changed (for example, according to a periodic, predetermined scheduled change of the function, based on the number of uses, etc.). FIG. 6 provides a flowchart of these embodiments where a subsequent second message is to be encrypted and sent.

Prior to the flowchart of FIG. 6, the sending computing device 110 retrieves the raw key. In preferred embodiments, the raw key is not stored. In these embodiments, the sending computing device 110 re-solves the function selected at step 310 to regenerate the raw key.

However, in other embodiments, it is contemplated that the sending computing device 110 stores the raw key. In these embodiments, the sending computing device 110 simply retrieves the stored raw key from memory.

At step 610, the sending computing device 110 selects a new (second) starting point and length and applies the second starting point and length to the raw key at step 620 to derive a third shortened key. In some embodiments, only a new starting point is selected and the length is maintained.

The sending computing device 110 then encrypts the second message using the third shortened key at step 630 and sends it to the receiving computing device 120 along with the second starting point and length.

At step 640, the receiving computing device 120 obtains the second raw key (by regenerating it or, in other embodiments, retrieving it from memory) and applies the second starting point and length to the second raw key to generate a fourth shortened key. As with the first and second shortened keys, the third and fourth shortened keys mirror one another because they were generated using matching starting points and lengths off of mirroring raw keys. At step 650, the receiving computing device 120 can then decrypt the message using the fourth shortened key.

As discussed above, in one-time pad applications, the key must be at least the same length as the message. Thus, in embodiments of the inventive subject matter, the sending computing device 110 does not send a length along with the starting point. Instead, in these embodiments, the shortened key is made to be of the same length as the message being encrypted (and thus the same length of the encrypted message). Therefore, where the receiving computing device 120 receives the encrypted message and the starting position (such as at steps 520 and 630 above), it is programmed to use the length of the encrypted message as the length of the shortened key to be generated.

In embodiments, the start digit comprises a plurality of digits arranged in a sequence. Thus, instead of a specific digit within the decimal of the raw key, the sending computing device 110 instead scans the raw key until it finds a particular pattern of digits. It then applies the length from the last digit in the pattern.

In embodiments, the sending computing device 110 also applies a bouncing logic to the raw key to generate the shortened key. In these embodiments, the length remains the same but the digits making up the shortened key are not the consecutive digits following the start digit. Instead, the bouncing logic is an instruction that dictates how the digits are found by "bouncing" within the decimals of the raw key according to the logic. For example, if the bouncing logic was "forward five, back three", the sending computing device 110 advances, from the start digit (which would be the first digit of the shortened key), five digits and that digit would be the second digit of the shortened key. Then, the sending computing device 110 counts three digits back, and selects that digit as the third digit of the shortened key. From there, it advances five more digits to obtain the fourth digit of the shortened key, then three digits back for the fifth digit of the shortened key, and so on, until the shortened key meets the length in terms of amount of digits.

Blockchain Implementations

Blockchain is essentially a database that is shared across multiple parts of a computer network. Unlike a normal database, the goal of blockchain is to allow for data storage, but not for data editing. Because of its immutability, blockchain is well suited for transaction histories, including for example, cryptocurrency transactions and smart document systems.

All cryptographically secure blockchains rely upon some form of encryption to provide security. For example, Bitcoin encryption uses a public key, which is like a Bitcoin address, and a private key that is used in conjunction with the public key to execute a Bitcoin transaction.

Regardless of the form of security used, transactions on a blockchain are executed using some form of a state transition function. Essentially, when a new transaction is entered, the transaction is transmitted to peer-to-peer nodes in the network, which then solve equations to confirm validity of the transaction. See e.g., Blockchain Encryption: What Is It and How It Works, at https://daglar-cizmeci.com/blockchain-encryption/.

Where a passcode or other key is utilized during the state transition function, it is possible for an unauthorized party to hack the system, identify the key, and enter a fraudulent transaction. With improvements in breaking encryption codes, blockchain systems are seeking ever more and sophisticated encryption schemes. For example, schemes using the older RSA type encryption have begun to utilize 1024 bit, 2048, and even longer keys. But storing and transmitting many instances of such long keys can be impractical, and even very long prime number keys can now be broken. See e.g., pending U.S. application Ser. No. 17/103,743 to Grant. It is entirely possible that even the elliptic curve cryptographic system sued by Bitcoin can be broken.

It is now contemplated that it would useful to employ a cryptographic system using keys of substantially any length, without the attendant problems of storing and transmitting large keys. This could readily be accomplished using the methods of generating and storing encryption keys discussed in the parent application.

In particular, it is contemplated that a node member of a network involved in executing a state transition function for a blockchain, can operate by:

receiving (a) a proposed transaction, (b) a function resolvable to an irrational number, (c) a starting point and (d) a length;
    using the starting point and the length to determine a sequence of digits within the irrational number;
    using at least a portion of the sequence of digits to determine a key; and
    using they key to encrypt at least a portion of the blockchain during execution of the state transition function.

In some contemplated embodiments, the function from which an irrational number can be determine comprises at least one of a ratio and a root. Preferred roots for this purpose are square roots of non-perfect squares.

A key might or might not utilize the entirety of the sequence of digits. For example, the key might utilize every other or every third digit in the sequence. A key might alternatively include some or all of the sequence, with one or more additional characters or digits added to the beginning or end of the sequence, or included elsewhere within the sequence. A key might even utilize non-consecutive members of the sequence of digits, or perhaps a reverse or partially reversed sequence.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for a node computing device to execute and secure a state transition function for a blockchain, comprising:

the node computing device receiving, from a sending computing device, (a) a proposed transaction, (b) a function resolvable to an irrational number, (c) a starting point and (d) a length;
    the node computing device using the starting point and the length to determine a sequence of digits within the irrational number;
    the node computing device using at least a portion of the sequence of digits to generate a key; and
    the node computing device using the key to encrypt at least a portion of the blockchain during execution of the state transition function, wherein the blockchain is stored by at least one separate computing device.

2. The method of claim 1, wherein the function comprises at least one of a ratio and a root.

3. The method of claim 1, wherein the function comprises a square root of a non-perfect square.

4. The method of claim 1, wherein the portion of the sequence of digits used to generate the key is an entirety of the sequence of digits.

5. The method of claim 1, wherein the portion of the sequence of digits used to generate the key is an entirety of the sequence of digits.

6. The method of claim 5, wherein the step of the node computing device using at least a portion of the sequence of digits to generate a key comprising appending at least one additional character or digit to at least some of the sequence of digits.

7. The method of claim 1, wherein the portion of the sequence of digits used to generate the key is a proper subset of the sequence of digits.

8. The method of claim 7, wherein the step of the node using at least a portion of the sequence of digits to generate a key comprising appending at least one additional character or digit to at least some of the proper subset of the sequence of digits.

9. The method of claim 1, wherein the portion of the sequence of digits used to generate the key comprises non-consecutive members of the sequence of digits.

\* \* \* \* \*